(12) United States Patent
Amlie et al.

(10) Patent No.: US 8,191,904 B2
(45) Date of Patent: Jun. 5, 2012

(54) HYBRID LEVELING SYSTEM

(75) Inventors: Tom Amlie, Orange, CA (US); Angel Ching, Montebello, CA (US)

(73) Assignee: Barksdale, Inc., Los Angeles, CA (US)

( * ) Notice: Subject to any disclaimer, the term of this patent is extended or adjusted under 35 U.S.C. 154(b) by 126 days.

(21) Appl. No.: 12/587,178

(22) Filed: Oct. 2, 2009

(65) Prior Publication Data

US 2011/0079969 A1   Apr. 7, 2011

(51) Int. Cl.
*B60G 17/015* (2006.01)
*B60G 17/04* (2006.01)

(52) U.S. Cl. ............... 280/5.514; 267/64.16; 280/6.159; 280/124.16

(58) Field of Classification Search .................. 267/256, 267/64.11, 64.16, 113, 114; 280/5.514, 6.151, 280/6.157, 6.158, 6.159, 124.157, 124.159, 280/124.16; 701/37
See application file for complete search history.

(56) References Cited

U.S. PATENT DOCUMENTS

| | | | |
|---|---|---|---|
| 2,905,430 A * | 9/1959 | Deist | 251/54 |
| 3,651,555 A | 3/1972 | Kataoka | |
| 4,335,901 A * | 6/1982 | Gladish | 280/6.151 |
| 4,361,346 A * | 11/1982 | Harris | 280/5.508 |
| 4,468,050 A * | 8/1984 | Woods et al. | 280/5.514 |
| 4,629,212 A * | 12/1986 | Takizawa et al. | 280/5.519 |
| 4,674,767 A * | 6/1987 | Kuroki et al. | 280/5.513 |
| 4,685,689 A * | 8/1987 | Takizawa et al. | 280/5.503 |
| 4,714,271 A * | 12/1987 | Buma et al. | 280/5.503 |
| 4,936,604 A * | 6/1990 | Kawagoe et al. | 280/5.503 |
| 4,971,360 A * | 11/1990 | Pischke et al. | 280/5.514 |
| 5,048,867 A * | 9/1991 | Gradert | 280/6.159 |
| 5,161,579 A * | 11/1992 | Anderson, Jr. | 137/627.5 |
| 5,517,847 A * | 5/1996 | Campbell et al. | 73/11.07 |
| 5,934,320 A | 8/1999 | O'Reilly et al. | |
| 6,061,615 A * | 5/2000 | Karthaeuser | 701/37 |
| 6,202,992 B1 | 3/2001 | O'Reilly et al. | |
| 6,260,860 B1 * | 7/2001 | Brookes et al. | 280/6.157 |
| 6,412,790 B2 * | 7/2002 | McKenzie et al. | 280/6.159 |
| 6,623,016 B2 * | 9/2003 | Sulzyc et al. | 280/5.514 |
| 6,918,600 B2 * | 7/2005 | Dodd et al. | 280/5.508 |
| 6,935,625 B2 | 8/2005 | Bolt et al. | |
| 7,192,012 B2 | 3/2007 | Bolt et al. | |
| 7,841,608 B2 * | 11/2010 | Morris et al. | 280/124.16 |
| 7,887,065 B2 * | 2/2011 | Trudeau et al. | 280/5.514 |
| 2005/0212225 A1 * | 9/2005 | Suzuki et al. | 280/5.514 |
| 2008/0315539 A1 | 12/2008 | Steinbuchel | |
| 2009/0216403 A1 * | 8/2009 | Holbrook | 701/37 |
| 2010/0025946 A1 * | 2/2010 | Inoue et al. | 280/6.157 |
| 2010/0250065 A1 * | 9/2010 | Kelly et al. | 701/37 |

* cited by examiner

*Primary Examiner* — Joseph Rocca
*Assistant Examiner* — Laura Freedman
(74) *Attorney, Agent, or Firm* — Leon D. Rosen

(57) ABSTRACT

A large vehicle with air bags and a leveling system that controls air flow into and out of an air spring (also known as an "air bag") to maintain the air spring height close to the optimum level. The system is altered at minimum cost to further minimize the repeated flow of air into and out of the air spring, to thereby save fuel. A mechanical-to-electrical converter (50) is mounted on the air spring height sensor to generate an electrical signal indicating vehicle ride height, and the electrical output is connected to a computer (62) on the vehicle. The computer is programmed to control the flow of pressured air through a blocking valve (60) to a leveling valve (22) that flows air into and out of the air spring, according to the outputs of a plurality of sensors on the vehicle.

5 Claims, 1 Drawing Sheet

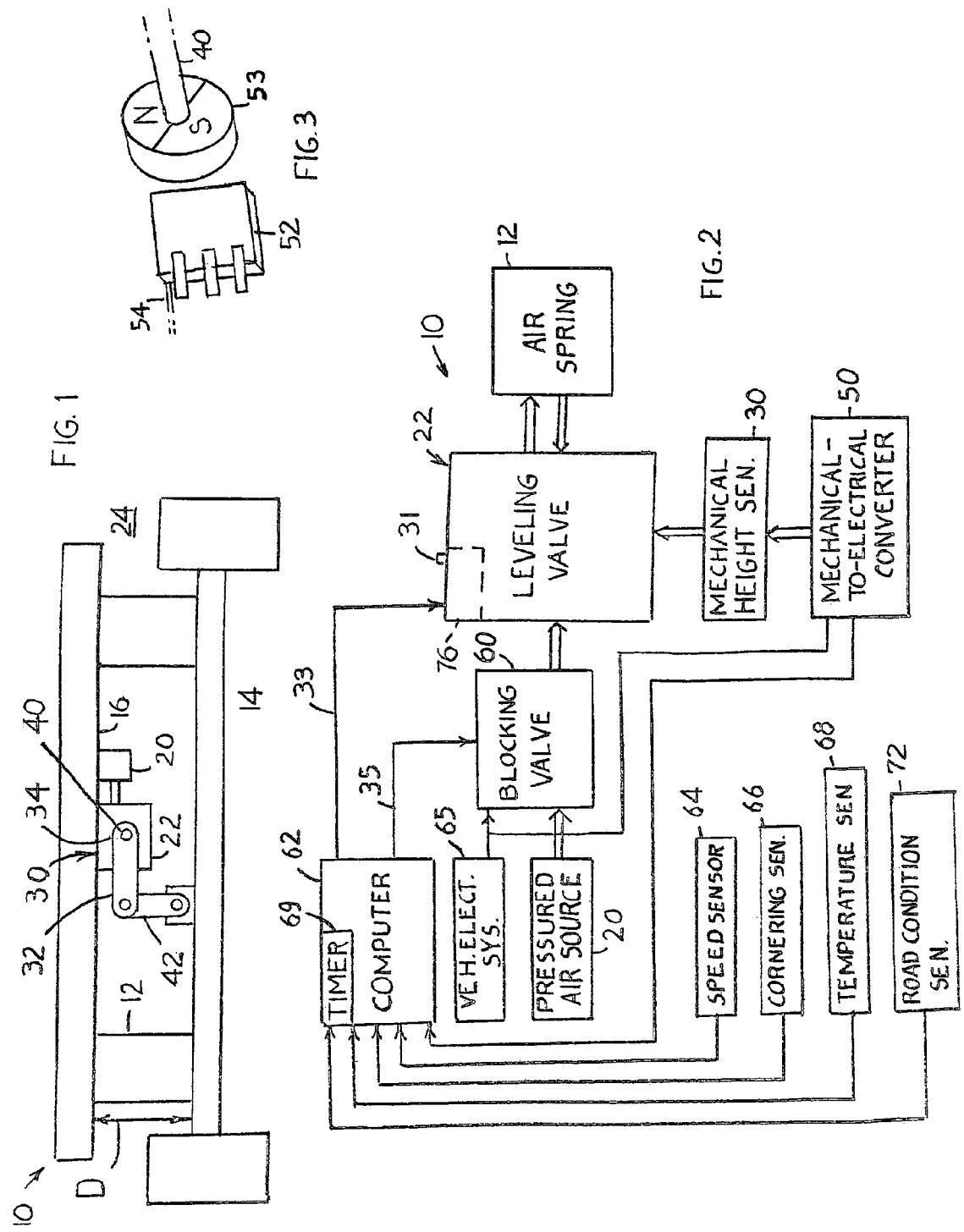

HYBRID LEVELING SYSTEM

BACKGROUND OF THE INVENTION

Air springs (sometimes called "air bags") are commonly used in large vehicles (e.g. unloaded weight of over 5 tons) such as tractor-trailers, as springs to support the vehicle chassis on axles and to support the cab on the chassis. A vehicle manufacturer sets the preferred air spring heights, such as 15 inches ±0.25 inch, to maintain good suspension geometry, drive line angle (angle of the transmission vs. angle of the differential), etc. A leveling system such as one with a rotating shaft shown in U.S. Pat. No. 6,202,992, or one with a vertically sliding part shown in US publication 2008/0315539, includes a height sensor that controls a leveling valve. The leveling valve controls the flow of pressured air from a pressured air source into the air spring to increase its height and controls the outflow of air from the air spring to the atmosphere to decrease its height. With the leveling valve mounted on the chassis, the height sensor is typically in the form of a lever that extends between the axle and the chassis. Pivoting of the lever moves a valve member to operate the leveling valve. The leveling valve and height sensor are purely mechanical devices that operate without an electrical input or output.

A blocking valve may be placed between the air pressure source and the leveling valve, with the blocking valve controlled to stop the flow of air into or out of the air spring in situations that indicate that an air spring height change is temporary. An example of such temporary changes is when the air spring height repeatedly changes due to the vehicle travelling over a rough road that causes the vehicle to bounce up and down. It is desirable to minimize the flow of air from the pressured source because such flow results in an increased use of fuel. However, present leveling valves are already constructed to minimize pressured air flow, as by dampeners that normally allow only a very slow increase in rate of air flow into and out of the air spring. Any system for further reducing wastage of pressured air must be capable of being installed at low cost in order to gain acceptance.

SUMMARY OF THE INVENTION

In accordance with one embodiment of the invention, applicant provides a vehicle leveling system and a method for installing it in a vehicle, at low cost, which enables further reduction in the unnecessary use of pressured air. The system uses a preexisting computer and preexisting sensors in the vehicle, and adds a minimum of devices, to control a blocking valve that blocks pressured air flow to the leveling valve.

The most important factor to use for determining whether or not air is to be flowed into or out of the air spring is the height of the air spring. Applicant mounts a mechanical-to-electrical sensor on the leveling valve to generate an electrical signal that indicates air spring height, with the output of the mechanical-to-electrical sensor output connected to the computer. Other sensors for sensing factors such as vehicle speed and elapsed time, are already present in the vehicle. The vehicle manufacturer who buys the leveling valve with the mechanical-to-electrical sensor already installed on it, programs his computer to minimize pressured air flow, based on the outputs of sensors already installed on the vehicle. This avoids the cost for installing such sensors and the laying of wires to connect the additional sensors to the computer. The cost for writing a computer program is low when spread over the multiple vehicles made by the manufacturer. The vehicle manufacturer also installs a blocking valve (if not already part of a leveling valve) that blocks the passage of pressured air to the leveling valve, and connects an output of the computer to the blocking valve.

The fact that the vehicle manufacturer only has to obtain a leveling valve with an air spring height sensor having an electrical output, connect that sensor to the onboard computer, program the computer, and install a blocking valve, results in a low cost to install the vehicle leveling system.

The novel features of the invention are set forth with particularity in the appended claims. The invention will be best understood from the following description when read in conjunction with the accompanying drawings.

BRIEF DESCRIPTION OF THE DRAWINGS

FIG. 1 is a rear view of a vehicle leveling system of the prior art installed in a vehicle.

FIG. 2 is a block diagram of a vehicle leveling system of the invention, with mechanical connections indicated by close double lines and electrical connections each indicated by a single line.

FIG. 3 is a mechanical-to-electrical converter mounted on the leveling valve of FIG. 2.

DESCRIPTION OF THE PREFERRED EMBODIMENTS

FIG. 1 illustrates a portion of a vehicle leveling system 10 which controls the height of at least one air spring 12. The air spring (sometimes called an "air bag") lies between a vehicle axle 14 and the vehicle chassis 16 and is assumed to have a preferred height of 15 inches. For a vehicle cab a common height is 5 inches. In most cases two air springs are provided for each vehicle axle, the air springs each supporting a different side of the axle and the air springs being connected together to have the same air pressure, but in the following description we discuss only one of the air springs. The vehicle leveling system includes a leveling assembly 18 (FIG. 2) that includes a leveling valve 22 and a height sensor 30. A pressured air source 20 supplies air at a pressure of about 130 psi to the leveling valve 22. The leveling valve is commonly mounted on the vehicle chassis. The leveling valve controls the flow of the pressured air through the leveling valve into the air spring 12 (which is commonly at about 40 psi for a 15 inch air spring) and controls the flow of air out through a vent 31 of the leveling valve into the atmosphere 24. When no signals passes along line 33 to the leveling valve or along line 35 to the blocking valve 60, the system operates in the prior art mode, with air flow into and out of the leveling valve 22 controlled by the height sensor 30.

The leveling valve is controlled primarily by the height sensor 30 (FIG. 1) which includes a height-indicating part formed by an elongated link 32 that has one end 34 connected to a shaft 40 of the leveling valve to rotate the shaft. The opposite end of the link is pivotally connected to a bar or second link 42 that is pivotally mounted on the corresponding vehicle axle 14 (usually near the center of the length of the axle). When the distance D between the axle 14 and chassis 16 decreases, the valve shaft 40 turns clockwise and the leveling valve allows air to flow from the pressured air source 20 to the air spring to increase its pressure and therefore increase its height. When the height of the air spring increases, the shaft 40 turns counterclockwise and the leveling valve allows air to escape from the air spring into the atmosphere. This type of leveling valve is shown in U.S. Pat. No. 6,202,992.

When the vehicle passes along a rough road that causes the vehicle to bounce along the road, the shaft 40 repeatedly turns in one direction and then in the opposite direction as the air spring height repeatedly increases and decreases. This results in air being repeatedly drained from the air spring and then flowed from the pressured air source into the air spring to refill it. It is known to provide a dampener that causes air flow to rise only slowly so only a small amount of air flows out of the pressured air source by the time that the air spring height stops decreasing, although air still flows out of the air spring each time the air spring height increases. The dampener still allows a rapid inflow of air into the air spring a short time after the air has been removed, sometimes causing overfill. The dampener also allows air flow into or out of the air spring when the environmental temperature increases or decreases, causing a long term change in air spring height that is properly countered by a flow of air into or out of the air spring.

Other less common instances of vehicle travel cause a temporary flow of air into or out of the air spring, when such flow may or may not be necessary. One situation when air spring height should not be changed is when the vehicle moves around a curve in the road for a short period of time such as no more than a minute. If the vehicle is moving along a very long curved road, such as one that extends in circles around a mountain, then it is usually desirable to change air spring height to what is indicated by the height sensor 30. When a load is placed in the vehicle chassis, such as when a heavy object is placed in the chassis over the air spring, the air spring height decreases and air should flow into the air spring to increase the height to the designated height level such as 15 inches. If a load is removed from over the air spring and causes an increase in air spring height, then air should flow out of the air spring. The prior system does this. If there is a change in vehicle height not due to temperature change, while the vehicle is traveling on the road, then this indicates an error and a fault should be registered and the driver should be notified. If an air spring should develop a leak, then air should continually flow into the air spring and the driver should be notified of this.

The fuel savings that occur from more closely controlling air flow into and out of an air spring are only modest, and a more sophisticated system for providing such close control will not be adopted by a vehicle manufacture unless the cost spread over a plurality of years is considerably lower than the fuel savings. Applicant's system of FIG. 2 allows such sophisticated control at a low cost.

Applicant notes that present large vehicles usually have a plurality of sensors that are connected to a computer on the vehicle. Such sensors commonly sense vehicle speed, elapsed time, atmospheric temperature, and vehicle cornering (e.g. by a mass that lies between springs in a tube that extends in a direction between opposite sides of the vehicle). The computer may use the output from such sensors to warn the driver of excess speed especially when cornering, remind him to take a rest after a long time of driving, or warn him that the cargo may be heated excessively by a high temperature, or for other purposes. The vehicle manufacturer programs the computer to provide the outputs that the manufacturer decides are important. Applicant notes that a computer can be "hard wired" to be the equivalent of software that programs a computer.

One factor that is very important in controlling the vehicle leveling system 10 is the height of the air spring. As mentioned above, the height of the air spring is determined by the rotational position of the link 32, which is rotationally fixed to the leveling valve shaft 40, which operates a rotational valve that controls flow to and from the air bag. In accordance with the present invention, applicant connects a mechanical-to-electrical sensor, or converter 50, shown in FIG. 2, to the shaft 40 of the leveling valve. FIG. 3 shows an example of such a converter which includes a Hall sensor 52. A magnet 53 with North and South poles N and S, is fixed to the valve shaft 40 to rotate with it. The Hall sensor detects the rotational position of the valve shaft at any given time. Applicant mounts a wire or other electrical conductor 54 on the vehicle to carry the electrical output of the Hall sensor to the vehicle computer. A blocking valve 60 (FIG. 2) has been positioned between the pressured air source 20 and the leveling valve (22). The vehicle computer 62 has been programmed to determine whether or not to open or close the blocking valve 60, according to the present situation as determined by the outputs of sensors connected to the computer. The computer 62 and converter 50 are powered by a vehicle electrical system 65. The electrical system output is used to switch the blocking valve 60 to a closed state (it is open when not receiving current) and to open an auxiliary vent valve 76 (which is closed when not receiving current).

In one example, the vehicle manufacturer may program the computer to open the blocking valve when the vehicle is stationary, so if a load is added or removed from a position over an axle, air can flow into or out of the air spring(s) that supports the axle. A speed sensor 64 (which was installed for the vehicle speedometer) may reliably detect only speeds above a few mph (miles per hour), so the computer may detect vehicle motion only when it exceeds perhaps 3 mph, and the computer is programmed accordingly to close (so air does not pass through it) the blocking valve above 3 mph. If the vehicle is moving and the air spring height changes, then the computer uses the sensors to determine whether or not the blocking valve should be opened.

If the air spring height repeatedly increases and decreases (e.g. every 2 seconds), then the vehicle is probably travelling over a rough road and the blocking valve remains closed. Pressured air that previously would have been wasted is not wasted. If the air spring height remains different from the preferred level for more than several seconds, but a cornering sensor 66 indicates that the vehicle is traveling around a curve, then the blocking valve may remain closed unless the air spring height change persists for more than a minute, thereby saving fuel. The elapsed time is indicated by a timer sensor 69 which is shown as part of the computer. A very slow change in air spring height accompanied by a large change in environmental temperature will usually indicate that the air spring height change is due to heating or cooling, as indicated by a temperature sensor 68, and the blocking valve will be unblocked until the height returns to the preferred level. If the air spring height continually decreases without any reason other than a leak, then this indicates a system leak, the blocking valve is opened, and a fault code is set and the driver is notified of this (e.g. by energizing a red light on the dashboard).

In some situations it can be advantageous to maintain a different air spring height for an extended period of time. For example, when the vehicle is traveling straight along a smooth highway at a considerable speed (e.g. above 30 miles per hour), then air resistance can be reduced by lowering the air spring height. For example, the air spring height may be lowered from 15 inches to perhaps 13 inches to reduce vehicle air resistance and therefore increase mileage.

FIG. 2 shows a road condition sensor 72, such as an accelerometer or bump sensor. When the road condition sensor 72 and speed sensor 64 indicate substantial speed on a smooth road, the computer can send a signal along line 33 to open an auxiliary vent valve 76 in the leveling valve 22 to vent air from the air bag 12, and the computer can send a signal to the blocking valve to close it (so air does not pass through it), until the height sensor 30 senses a predetermined lower air spring height. When the sensor 64 senses that the vehicle speed falls below the preset level, or sensor 72 detects one or a plurality of road shocks, the blocking valve 60 is allowed to open and the auxiliary vent valve 76 is closed, and the leveling valve automatically reinflates the air spring to its standard height. It is possible to provide a switch to reduce air spring height, which is operated by the vehicle driver.

If the vehicle electrical system should fail so the computer does not generate any signals, then the blocking valve 60 opens and the leveling system reverts to its mechanically-controlled operation. The mechanical height sensor 30 controls the leveling valve to maintain the preset height such as 15 inches.

Thus, the invention provides a vehicle leveling system that saves a moderate additional amount of fuel that would be used to repeatedly fill an air spring, where the system can be installed at low cost. The system includes the usual leveling valve with mechanical height sensor, that tends to flow air into or out of the air spring whenever its height changes by more than a predetermined amount (e.g. 0.25 inch) from a preferred height level (e.g. 15 inches). Applicant installs a blocking valve between the pressured air source and the leveling valve, and installs a mechanical-to-electrical height converter that generates an electrical output indicating air spring height. The blocking valve and height converter are both connected to a computer already present in the vehicle. The vehicle manufacturer programs the computer to open and close the blocking valve according to the output of the mechanical-to-electrical height converter and the outputs of one or more sensors that usually are already installed on the vehicle. This results in a low cost for installing the vehicle leveling system, which is justified by the savings in fuel that otherwise would be used to energize the engine to compress air for the pressured air source.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for establishing a vehicle leveling system on a vehicle that has an air spring (12) and a leveling assembly connected to the air spring, where said leveling assembly includes a leveling valve (22) and a height sensor that has a mechanical height-indicating part (30) that moves in first and second directions as a height of the air spring increases and decreases away from a predetermined first desired height, where the leveling valve mechanically controls air flow into and out of said air spring in accordance with movement of said mechanical height-indicating part, a pressured air source (20), and a blocking valve (60) that is controllable to block or allow the flow of air from said source to said leveling valve, where said vehicle includes an electrical system and a computer (62) with a plurality of computer inputs and at least one computer output and a plurality of vehicle parameter sensors that are each connected to said computer and that each senses a characteristic of the vehicle, including a vehicle speed parameter sensor (64) that senses vehicle speed, said computer being energized by said electrical system, comprising:

mounting a mechanical-to-electrical sensor (50) on said leveling assembly wherein said mechanical-to-electrical sensor generates an electrical signal output indicating the height of said air spring according to a position of said mechanical height-indicating part, and electrically connecting said mechanical-to-electrical sensor output to one of said computer inputs;

connecting said speed parameter sensor (64) to one of said computer inputs;

connecting a first of said at least one computer output to said blocking valve (60);

programming said computer to deliver a signal on said at least one computer output, to said blocking valve according to inputs from said mechanical-to-electrical sensor and from said speed parameter sensor, to open said blocking valve when said speed parameter sensor indicates a vehicle speed below a predetermined level which indicates that the vehicle is stationary.

2. The method described in claim 1 including:

programming said computer to deliver a signal on said at least one computer output to said blocking valve to close said blocking valve after said blocking valve was opened with said vehicle being stationary, until a change in air spring height is detected, when said speed parameter sensor senses a vehicle speed that indicates that said vehicle is moving.

3. The method described in claim 1 wherein:

said plurality of vehicle sensors includes a sensor (72) that senses road condition by sensing smoothness and road shocks;

said leveling valve has an auxiliary vent valve (76) that is electrically controllable to exhaust air from said air spring; and including programming said computer to send a signal to said auxiliary vent valve to open said auxiliary valve to exhaust air from said air spring, while closing said blocking valve when a smooth road condition is sensed, until said computer receives a signal from said mechanical-to-electrical sensor that a second desired height that is less than said first desired height, has been reached.

4. A method for establishing a vehicle leveling system on a vehicle that has a pressured air source (20), an air spring (12), a height sensor (30) that senses a height of said air spring height, and a leveling valve (22) that controls the flow of pressured air from said pressured air source (20) into said air spring and the flow of air out of said air spring in accordance with at least the air spring height sensed by said height sensor, said vehicle also having a blocking valve (60) that blocks or allows the flow of air from said pressured air source (20) to said leveling valve (22), wherein said vehicle has a computer (62) with a plurality of computer inputs and at least one computer output and said vehicle has a plurality of vehicle status sensors including a vehicle speed sensor (64) connecting to said computer, comprising:

connecting a first of said at least one computer output to said blocking valve (60);

programming said computer to deliver a signal through said first output to said blocking valve to open said blocking valve to adjust the height of said air spring when a vehicle speed sensed by said vehicle speed sensor is zero and to close said blocking valve to prevent an adjustment of said height of said air spring when the vehicle speed is greater than zero when no other vehicle status sensor delivers a signal to the computer, whereby the air spring height is raised and lowered when a load is respectively placed over and removed from over the air spring when the vehicle is stationary.

5. A method for establishing a vehicle leveling system on a vehicle that has an air spring (12) and a leveling assembly connected to the air spring, where said leveling assembly includes a leveling valve (22) and a height sensor that has a mechanical height-indicating part (30) that moves in first and second directions as a height of the air spring increases and decreases away from a predetermined first desired height, where the leveling valve mechanically controls air flow into and out of said air spring in accordance with movement of said mechanical height-indicating part, a pressured air source (20), and a blocking valve (60) that is controllable to block or allow the flow of air from said source to said leveling valve, where said vehicle includes an electrical system and a computer (62) with a plurality of computer inputs and at least one computer output and a plurality of vehicle parameter sensors that are each connected to said computer and that each senses a characteristic of the vehicle, including a vehicle speed parameter sensor (64) that senses vehicle speed, and a temperature sensor, said computer being energized by said electrical system, comprising:

mounting a mechanical-to-electrical sensor (50) on said leveling assembly wherein said mechanical-to-electrical sensor generates an electrical signal output indicating the height of said air spring according to a position of said mechanical height-indicating part, and electrically connecting said mechanical-to-electrical sensor output to one of said computer inputs;

connecting said speed parameter sensor (64) to one of said computer inputs;

connecting a first of said at least one computer output to said blocking valve (60);

programming said computer to deliver a signal on said at least one computer output, to said blocking valve according to inputs from said mechanical-to-electrical sensor and from said speed parameter sensor, to open said blocking valve when said speed parameter sensor indicates a vehicle speed below a predetermined level which indicates that the vehicle is stationary;

programming said computer to deliver a signal on said first of said at least one computer output to said blocking valve, to unblock said blocking valve when said temperature sensor indicates a change in environmental temperature that is not accompanied by a corresponding air spring height change.

\* \* \* \* \*